(12) United States Patent
Hetzer et al.

(10) Patent No.: US 7,933,484 B2
(45) Date of Patent: Apr. 26, 2011

(54) STRAIN-RELIEF DEVICE FOR CABLES AND WIRE-GUIDING ELEMENT

(75) Inventors: Ulrich Hetzer, Berlin (DE); Frank Moβner, Berlin (DE); Hans-Joachim Faika, Berlin (DE)

(73) Assignee: ADC GmbH, Berlin (DE)

( * ) Notice: Subject to any disclaimer, the term of this patent is extended or adjusted under 35 U.S.C. 154(b) by 266 days.

(21) Appl. No.: 12/033,597

(22) Filed: Feb. 19, 2008

(65) Prior Publication Data

US 2008/0210829 A1  Sep. 4, 2008

(30) Foreign Application Priority Data

Feb. 26, 2007  (DE) .................. 10 2007 009 223

(51) Int. Cl.
  *G02B 6/00*  (2006.01)
(52) U.S. Cl. ........ 385/137; 385/134; 385/136; 439/449; 439/470
(58) Field of Classification Search .................. 385/136, 385/137; 439/449, 470
  See application file for complete search history.

(56) References Cited

U.S. PATENT DOCUMENTS

| | | | | |
|---|---|---|---|---|
| 6,078,719 | A * | 6/2000 | Wiegand et al. | ............. 385/137 |
| 6,771,871 | B2 * | 8/2004 | Krampotich et al. | ......... 385/134 |
| 7,025,621 | B2 | 4/2006 | Mossner et al. | |
| 7,228,048 | B1 * | 6/2007 | Dunfee et al. | ................ 385/136 |
| 7,236,676 | B2 * | 6/2007 | Lalonde | ........................ 385/134 |
| 7,371,106 | B2 | 5/2008 | Nad | |
| 7,387,533 | B2 | 6/2008 | Hetzer et al. | |
| 2004/0014367 | A1 | 1/2004 | Petersen | |
| 2005/0058422 | A1 * | 3/2005 | Doss et al. | ..................... 385/137 |
| 2007/0036508 | A1 * | 2/2007 | Sato | ............................... 385/137 |
| 2008/0098571 | A1 | 5/2008 | Morris | |
| 2008/0179469 | A1 * | 7/2008 | Leone et al. | .................... 248/56 |

FOREIGN PATENT DOCUMENTS

| | | |
|---|---|---|
| DE | 1 055 414 | 4/1959 |
| DE | 25 13 591 | 10/1976 |
| DE | 44 06 154 | 3/1995 |
| DE | 20 2006 006 641 | 8/2006 |

* cited by examiner

*Primary Examiner* — Ryan Lepisto
(74) *Attorney, Agent, or Firm* — Merchant & Gould P.C.

(57) ABSTRACT

A strain-relief device for cables, in particular optical waveguide cables, includes a lower part (10), which is in the form of a U in cross section, and an upper part (30). The lower part (10) is formed on its limbs (12) on one end side (16) with a pivot bearing and on the opposite end side (13) with latching tabs (14), which are arranged on the inner sides of the limbs (12). The upper part (30) includes at least two sprung lateral limbs (31), on whose outer side in each case at least one latching projection (35) is arranged, which latching projections (35), in the assembled state, latch behind the latching tabs (14) on the lower part (10). The upper part (30) also includes spindle means, which can be inserted into the pivot bearing in the lower part (10), and to a wire-guiding element (60), in particular for optical waveguide wires. The wire-guiding element (60) includes a lower part (40) and an upper part (50). The lower part (40) is formed in the longitudinal direction (L) with guides (46), which are formed between guide webs (45), clamping ribs (47) being arranged on the inner sides of the guide webs (45), and having first fixing means on the upper side (44). The upper part (50) has second fixing means on its lower side (51) which produce a connection with the first fixing means.

15 Claims, 6 Drawing Sheets

STRAIN-RELIEF DEVICE FOR CABLES AND WIRE-GUIDING ELEMENT

Figure 1:
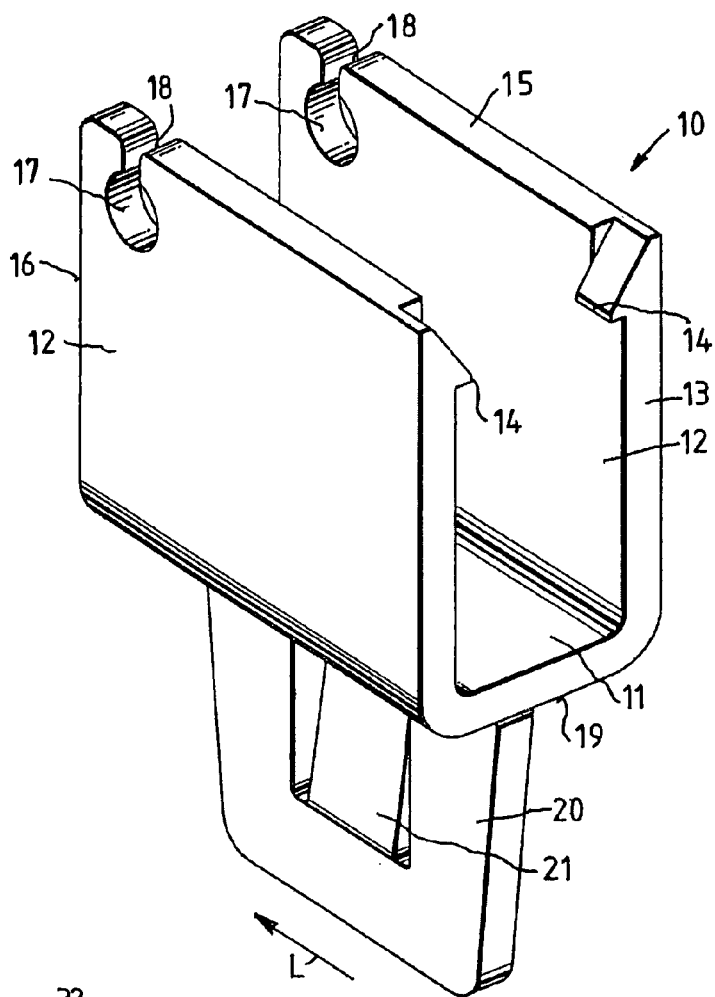

The invention relates to a strain-relief device for cables, in particular optical waveguide cables, and to a wire-guiding element, in particular for optical waveguide wires.

Strain-relief devices for cables are known in various embodiments. A common problem with strain-relief devices is that they are not very user-friendly if further cables are additionally intended to be connected as well, subsequently.

The invention is therefore based on the technical problem of providing a strain-relief device for cables, in particular optical waveguide cables, which makes subsequent fixing of cables easier. A further technical problem is that of providing a wire-guiding element, in particular for optical waveguide wires, which simplifies subsequent changes to the wires to be guided.

In this regard, the strain-relief device for cables comprises a lower part, which is in the form of a U in cross section, and an upper part, the lower part being formed on its limbs on one end side with a pivot bearing and on the opposite end side with latching tabs, which are arranged on the inner sides of the limbs, the upper part comprising at least two sprung lateral limbs, on whose outer side in each case at least one latching projection is arranged, which latching projections, in the assembled state, latch behind the latching tabs on the lower part, and comprising spindle means, which can be inserted into the pivot bearing in the lower part, the connection between the spindle means and the pivot bearing preferably being detachable.

As a result, a strain-relief device which can be manipulated in a very simple manner is provided. In this regard, the cable to be fixed is inserted into the U-shaped lower part, then the upper part with the spindle means is inserted into the pivot bearing, and the upper part is pushed down, as a result of which it latches with the latching projections on the latching tabs and in the process fixedly clamps the cable. In order to release the connection, for example in order to fix a further cable, the two sprung lateral limbs are pushed together inward, as a result of which the latching projections are guided laterally past the latching tabs and the upper part can be pivoted upward again. A new cable can then be inserted and the upper part pushed down again. Owing to the removal of the upper part, in this case the procedure can be facilitated since the new cable can now be inserted into the U-shaped lower part from above.

In a preferred embodiment, in each case at least two latching projections are arranged on the outer side of the sprung lateral limbs. This makes it possible to securely fix cables having different diameters or a different number of cables.

In a further preferred embodiment, the pivot bearing is in the form of a cylindrical opening with a gap toward the upper side of the limb and the spindle means is in the form of a web. In this case, the web is matched to the width of the gap, with the result that it can be guided through the gap into the opening. This means that the upper part can only be removed in a position in which the web and the gap are aligned and is otherwise connected to the lower part in a manner in which it cannot be released.

In a further preferred embodiment, a bow-shaped element is arranged above the two sprung lateral limbs and/or a sprung, plate-shaped element is arranged underneath, the sprung lateral limbs protruding at their free end beyond the bow-shaped element and the plate-shaped element. In this case, the plate-shaped element acts as a contact-pressure plate for the cables, the bow-shaped element being used to press the upper part down. As a result of the fact that the sprung lateral limbs protrude beyond the bow-shaped element and the plate-shaped element, they can still be gripped and pushed together easily in the assembled state. Owing to the sprung, plate-shaped element, any desired cable diameters are securely clamped since the latching projections on their own only form rough latching.

In a further preferred embodiment, the plate-shaped element has clearances, with the result that, when the upper part is pressed down, the plate-shaped element slides past the latching tabs of the lower part.

In a further preferred embodiment, the plate-shaped element is formed on its lower side with transverse ribs, which improve the contact-pressure against the cable and counteract a tensile force.

In a further preferred embodiment, a further plate-shaped element with a sprung cut-free portion is arranged on the lower side of the lower part, by means of which cut-free portion the strain-relief device can be fixed in a slit. However, in principle other fixing means are also possible.

The wire-guiding element comprises a lower part and an upper part, the lower part being formed in the longitudinal direction with guides, which are formed between guide webs, clamping ribs being arranged on the inner sides of the guide webs, and has first fixing means on the upper side, the upper part having second fixing means on its lower side which produce a connection with the first fixing means. As a result, very simple fixing of the wires, in particular of optical waveguide wires, is achieved, in particular in combination with the strain-relief device a situation being achieved in which the wires do not run in an undefined manner when the strain-relief device is opened. Optical waveguide wires are in this case understood to mean optical waveguide fibers with a separate sheathing.

Preferably, the first fixing means are in the form of holes, and the second fixing means are in the form of pins or knobs, or vice versa.

Further preferably, at least one hole is in the form of a slot in order to compensate for tolerances between the upper part and the lower part.

In a further preferred embodiment, the upper part has further first fixing means and guide webs on its upper side, which makes it possible to stack a plurality of wire-guiding elements one above the other, which is of particular advantage when further cables are additionally being fixed.

In a further preferred embodiment, a plate-shaped element with a sprung cut-free portion is arranged on the lower side of the lower part.

Figure 2:
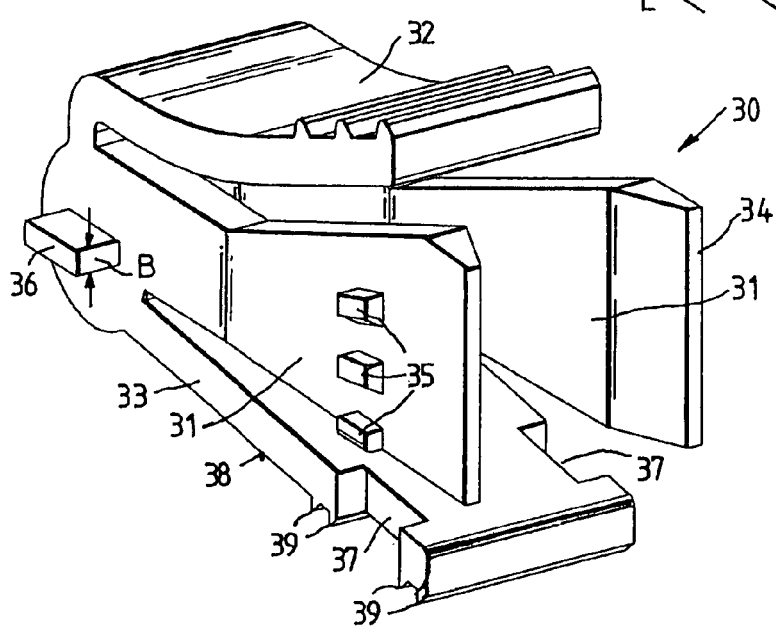
Figure 3:
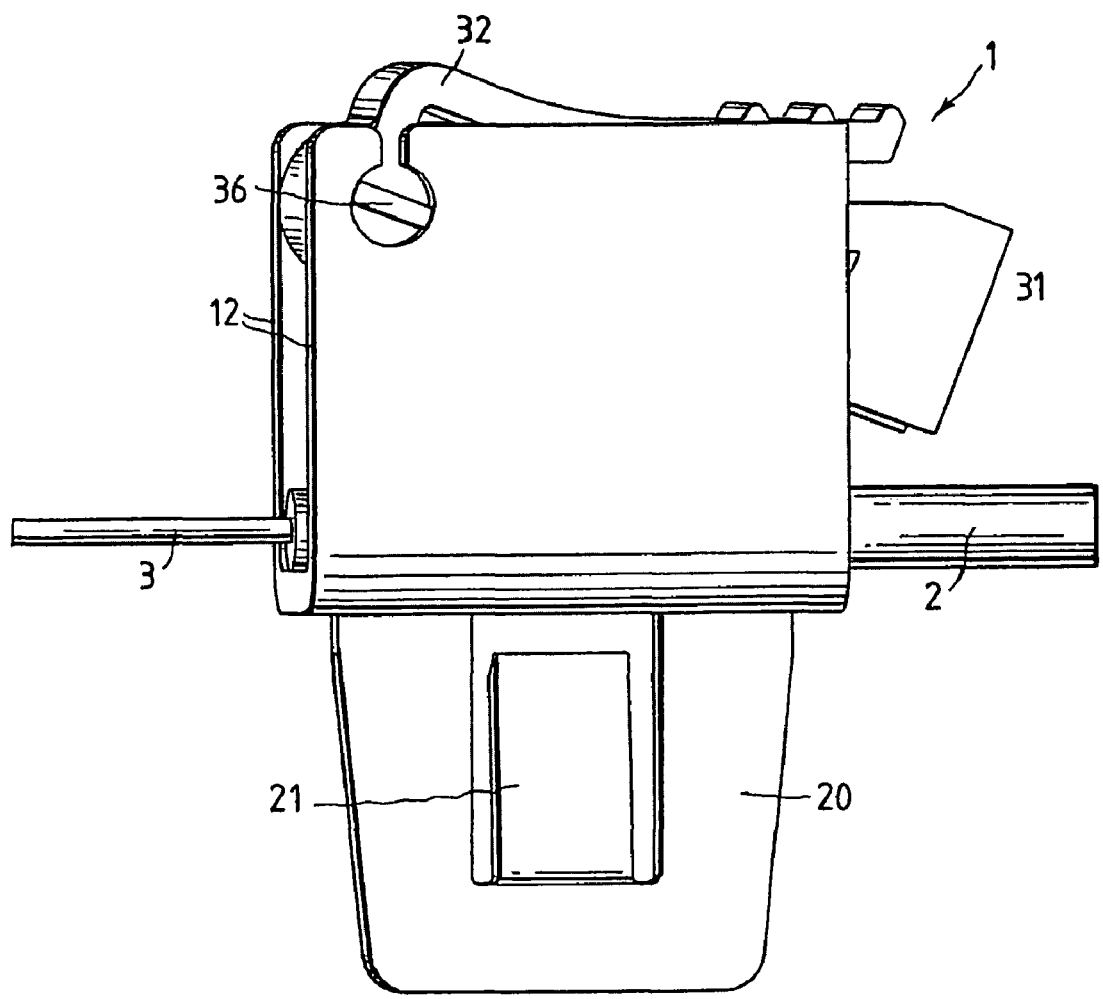
Figure 4:
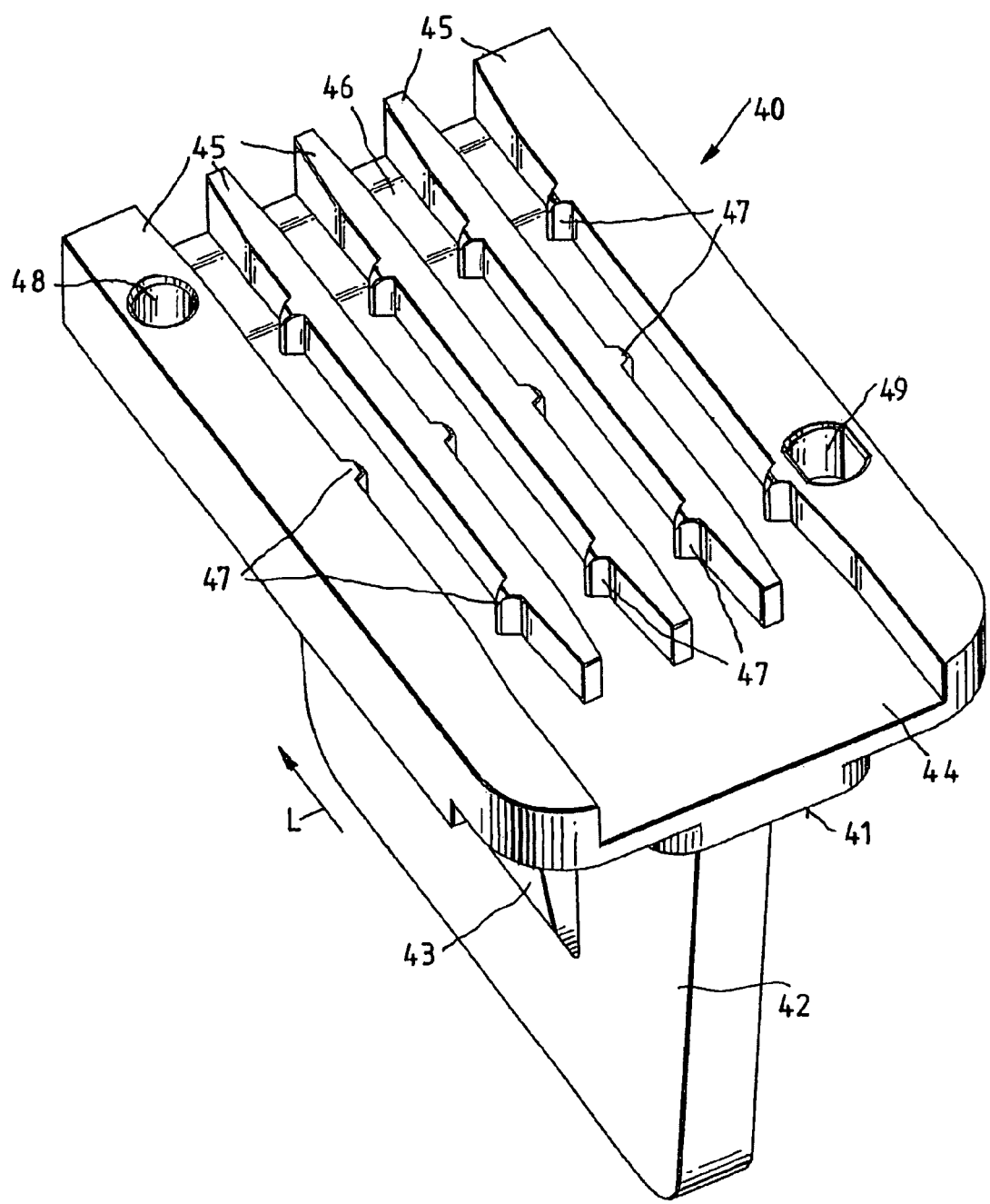
Figure 5:
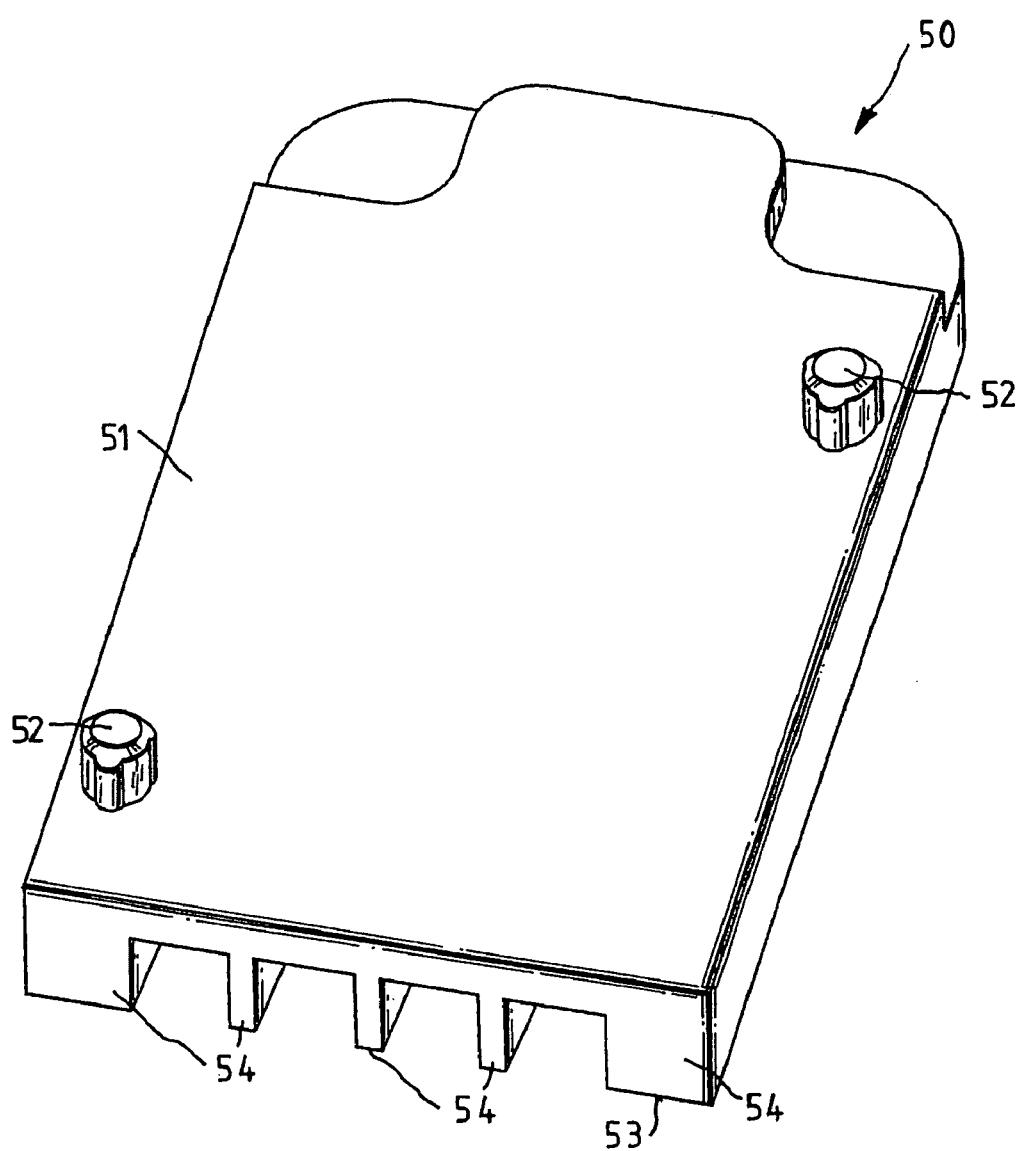
Figure 6:
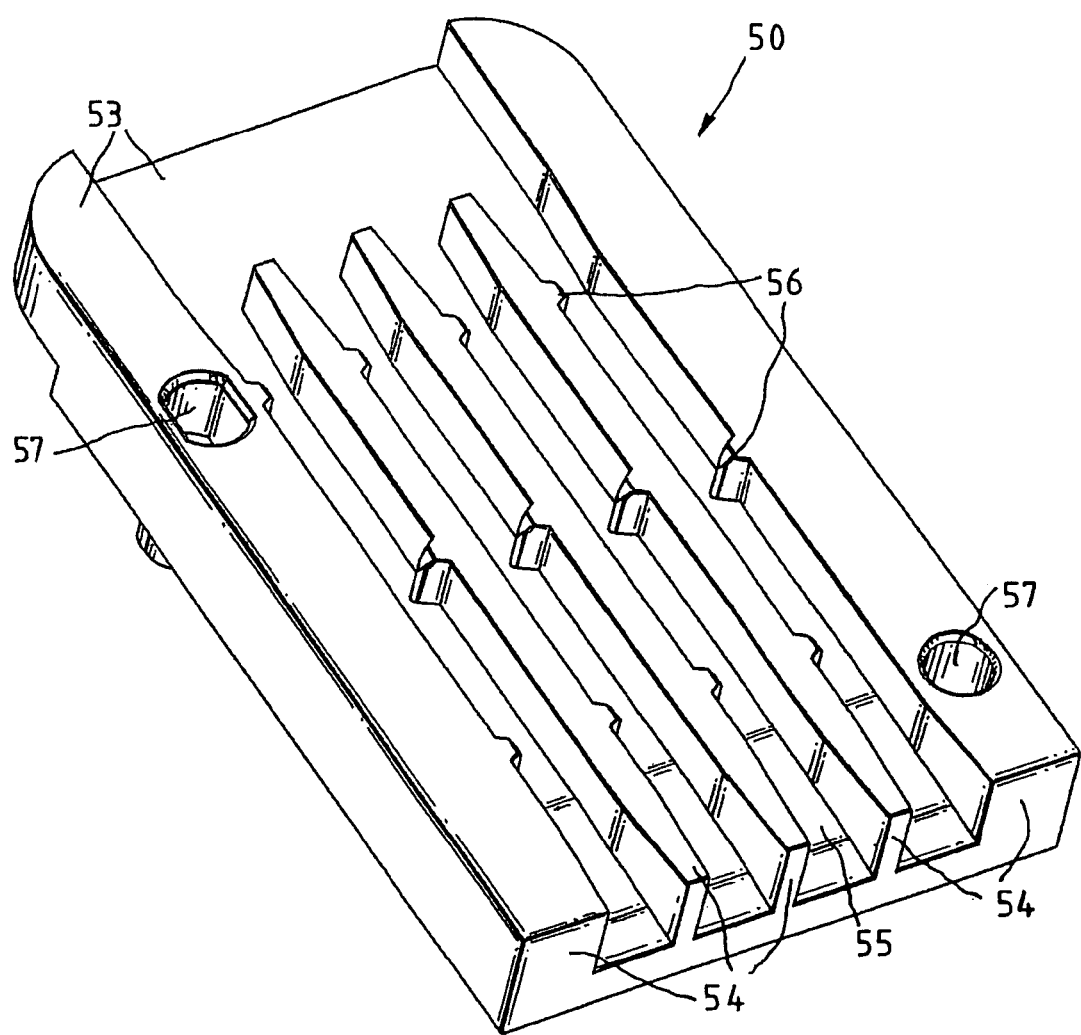
Figure 7:
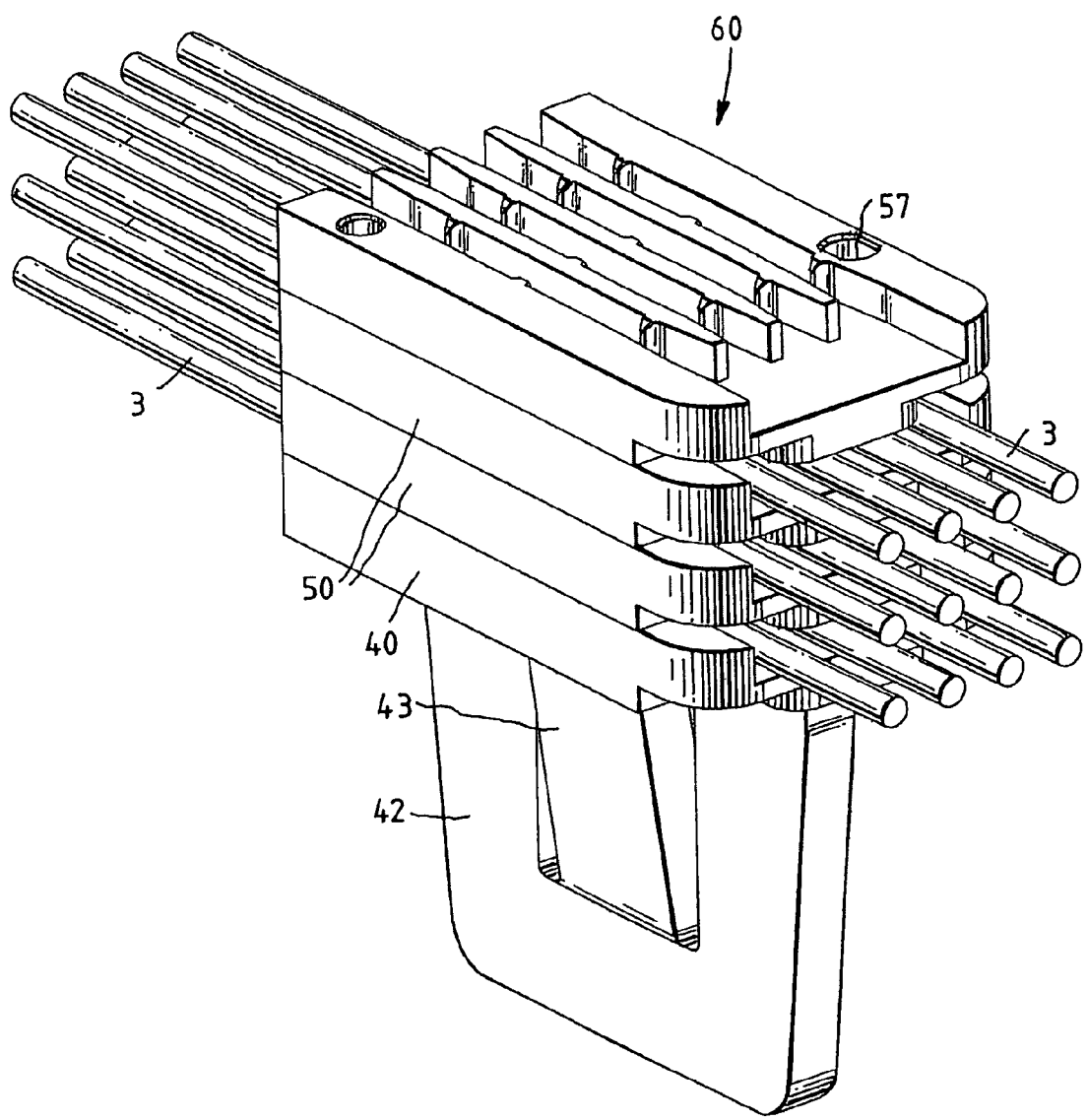

The invention will be explained in more detail below with reference to a preferred exemplary embodiment. In the figures:

FIG. 1 shows a perspective illustration of a lower part of a strain-relief device, FIG. 2 shows a perspective illustration of an upper part of a strain-relief device, FIG. 3 shows a perspective illustration of the strain-relief device in the assembled state with a cable clamped in, FIG. 4 shows a perspective plan view of a lower part of a wire-guiding element, FIG. 5 shows a perspective view from below of an upper part of a wire-guiding element, FIG. 6 shows a perspective plan view of the upper part of the wire-guiding element, and FIG. 7 shows a perspective illustration of an assembled, stacked wire-guiding element.

FIG. 1 illustrates a lower part 10 of a strain-relief device 1 for cables 2. The lower part 10 has a base 11, on which two limbs 12 are arranged, with the result that the lower part 10 has a U-shaped cross section. Two latching tabs 14, which extend inward from the upper side 15 of the lower part 10, are arranged on one end side 13 of the lower part 10 on the inner sides of the limbs 12. Two continuous cylindrical openings 17 are incorporated in the limbs 12 on an opposite end side 16, the cylindrical openings being open toward the upper side 15 by a gap 18. A plate-shaped element 20, which extends in the longitudinal direction L, is arranged on the lower side 19 of the base 11. In this case, the plate-shaped element 20 is formed at a right angle to the lower side 19. A sprung element 21 is cut free from the plate-shaped element 20 by means of free-punching. The illustrated lower part 10 is preferably produced integrally from plastic.

FIG. 2 illustrates an upper part 30 of a strain-relief device. The upper part 30 comprises two sprung lateral limbs 31, a bow-shaped element 32 and a sprung, plate-shaped element 33, which are all integrally connected to one another. At their free ends 34, in this case the two sprung lateral limbs 31 protrude beyond the bow-shaped element 32 and the plate-shaped element 33, respectively. In each case three latching projections 35 are arranged on the outer sides of the sprung lateral limbs 31.

In each case one web 36, whose width B is smaller than the width of the gap 18, is arranged on the side opposite the free ends 34 on the outer sides of the sprung lateral limbs 31. The thickness of the sprung lateral limbs 31 tapers in the direction toward the free ends 34. The plate-shaped element 33 has two clearances 37. Furthermore, four transverse ribs 39, which run away from the lower side 38 to a point, are arranged on the lower side 38.

In order to fix a cable 2, said cable is laid in the longitudinal direction L on the base 11 of the lower part 10. Then, the two webs 36 are inserted into the opening 17 through the gap 18, and the bow-shaped element 32 is pushed downward. In the process, the plate-shaped element 33 runs with its clearances 37 past the latching tabs 14. If the bow-shaped element 32 is pushed further downward, at first the lowermost latching projections 35 latch under the latching tabs 14. Depending on the thickness of the cable 2 or on the number of cables 2 in the lower part 10, the bow-shaped element 32 can then be pushed down further still, with the result that the central or even the upper latching projections 35 may engage behind the latching tabs 14. Owing to the sprung, plate-shaped element 33, in this case sufficient force is exerted on the cable 2 for fixing it securely. The completely assembled state is illustrated in FIG. 3, wherein an individual optical waveguide wire 3 is illustrated as being passed out of the cable 2. The strain-relief device can then be plugged into a slit via the plate-shaped element 20 and latched by means of the sprung element 21. In order to unlatch the upper part 30 of the strain-relief device 1, the two sprung lateral limbs 31 are pushed together inward, with the result that the latching projections 35 slide laterally past the latching tabs 14 and the bow-shaped element 32 can be pivoted upward again without any resistance.

FIG. 4 illustrates a lower part 40 of a wire-guiding element 60. Again a plate-shaped element 42 with a sprung element 43 is arranged on the lower side 41, it being possible for reference to be made to the embodiments in relation to the strain-relief device 1 as regards the operation. Five guide webs 45 are arranged on the upper side 44, the two outer guide webs being wider than the inner guide webs 45. Guides 46, into which wires to be fixed can be inserted, are formed between the guide webs 45. Clamping ribs 47 are arranged on the inner sides of the guide webs 45, preferably arranged alternately on the left-hand and right-hand guide web 45 of a guide 46.

Holes 48, 49 are introduced into the wider guide webs 45, which holes are used as first fixing means, the hole 49 being in the form of a slot.

FIGS. 5 and 6 illustrate an upper part 50 of the wire-guiding element 60, the lower side 51 virtually being a plane and only being interrupted by two knobs 52. The upper part 50 and the lower part 40 are connected to one another via the knobs 52, which represent second fixing means, by the knobs 52 being plugged into the holes 48, 49. On the upper side 53, the upper part has a similar structure to the upper side 44 of the lower part 40, namely guide webs 54, guides 55, clamping ribs 56 and holes 57. This makes it possible to arrange a plurality of upper parts 50 one above the other, which is illustrated in FIG. 7. In this case, four optical waveguide wires 3 are fixed in each upper part 50. Any desired number of optical waveguide fibers 3 can therefore be guided one above the other in a plurality of planes, according to the number of upper parts 50.

LIST OF REFERENCE SYMBOLS

1 Strain-relief device
2 Cable
3 Optical waveguide wire
10 Lower part
11 Base
12 Limb
13 End side
14 Latching tabs
15 Upper side
16 End side
17 Opening
18 Gap
19 Lower side
20 Plate-shaped element
21 Sprung element
30 Upper part
31 Sprung lateral limbs
32 Bow-shaped element
33 Plate-shaped element
34 Free ends
35 Latching projection
36 Web
37 Clearance
38 Lower side
39 Transverse rib
40 Lower part
41 Lower side
42 Plate-shaped element
43 Sprung element
44 Upper side
45 Guide web
46 Guide
47 Clamping rib
48, 49 Hole
50 Upper part
51 Lower side
52 Knobs
53 Upper side
54 Guide web
55 Guide
56 Clamping rib
57 Hole
60 Wire-guiding element
B Width
L Longitudinal direction

The invention claimed is:

1. A strain-relief device for cables, the strain-relief device comprising:
a lower part, which is in the form of a U in cross section, and an upper part,
the lower part including limbs that define a pivot bearing at one end and that define latching tabs at an opposite end, the latching tabs being arranged on inner sides of the limbs, and
the upper part including at least two sprung lateral limbs, a bow-shaped element, and a plate-shaped element that extend from a first side of the upper part to a second side of the upper part, at least one latching projection being arranged on an outer side of each lateral limb, which latching projections, in an assembled state, latch behind the latching tabs on the lower part, and the upper part including spindle means, which is configured to be inserted into the pivot bearing in the lower part;
wherein the bow-shaped element is arranged above the two sprung lateral limbs and the plate-shaped element is arranged underneath the two sprung lateral limbs.

2. The strain-relief device as claimed in claim 1, wherein in each case at least two latching projections are arranged on the outer side of each sprung lateral limb.

3. The strain-relief device as claimed in claim 1, wherein the pivot bearing is in the form of a cylindrical opening with a gap toward an upper side of each limb, and the spindle means is in the form of a web.

4. The strain-relief device as claimed in claim 1, wherein free ends of the lateral limbs protrude beyond the bow-shaped element and the plate-shaped element.

5. The strain-relief device as claimed in claim 4, wherein the plate-shaped element defines slots.

6. The strain-relief device as claimed in claim 4, wherein the plate-shaped element is formed on its lower side with transverse ribs.

7. The strain-relief device as claimed in claim 1, wherein a further plate-shaped element with a sprung cut-free portion is arranged on a lower side of the lower part.

8. A strain-relief device for cables, the strain-relief device comprising:
a lower part including a first base, a first limb, and a second limb, the limbs extending upwardly from the first base to define a U-shaped cross section, the lower part having a first end and a second end, the first and second limbs including latching tabs at the first end of the lower part, the first and second limbs defining a pivot bearing at the second end of the lower part; and
an upper part including a first deflecting member and a second deflecting member extending from a second base, the first and second deflecting members each defining a plurality of latching projections at exterior surfaces thereof, each of the latching projections being configured to engage the latching tabs of the lower part, the second base defining a spindle configured to cooperate with the pivot bearing to enable the upper part to pivot relative to the lower part;
wherein the upper part also includes a bow-shaped member extending from the second base, the bow-shaped element being spaced from and oriented transverse to the first and second members;
wherein the upper part also includes a plate-shaped member extending from the second base opposite the bow-shaped member; and
wherein the plate-shaped member defines clearances that are sized and configured to enable the latching tabs of the lower part to pass through the clearances.

9. The strain-relief device as claimed in claim 8, wherein each of the first and second deflecting members defines three latching projections.

10. The strain-relief device as claimed in claim 8, wherein the pivot bearing defines an opening in each limb of the lower part at the second end.

11. The strain-relief device as claimed in claim 10, wherein each limb also defines a gap at the second end extending between the opening and a periphery of the limb.

12. The strain-relief device as claimed in claim 11, wherein the spindle includes webs extending outwardly from opposite sides of the second base, wherein each web is configured to slide through the gap in one of the limbs to fit within the respective opening.

13. The strain-relief device as claimed in claim 8, wherein free ends of the first and second members extend beyond the bow-shaped member.

14. The strain-relief device as claimed in claim 8, wherein a lower side of the plate-shaped member defines transverse ribs.

15. The strain-relief device as claimed in claim 8, wherein the lower part includes a plate-shaped element extending in an opposite direction from the first and second limbs, the plate-shaped element including a spring element.

* * * * *